United States Patent Office 2,730,528
Patented Jan. 10, 1956

2,730,528

PURIFICATION OF MERCAPTOBENZOTHIAZOLE

Robert G. Weyker, Bound Brook, and Robert H. Ebel, Plainfield, N. J., assignors to American Cyanamid Company, New York, N. Y., a corporation of Maine No Drawing. Application June 18, 1953,
Serial No. 362,656

8 Claims. (Cl. 260—306)

This invention relates to the preparation of mercaptobenzothiazoles. More particularly, it is concerned with a method of purifying mercaptobenzothiazoles to convert the crude products to a form more acceptable commercially.

Mercaptoarylenethiazoles, particularly as exemplified by the 2-mercaptobenzothiazoles, have been found to be particularly useful as accelerators in the vulcanization of rubber. As a result, many processes have been developed for the commercial preparation of these compounds. Of these, probably the most successful and widely used has been that of U. S. Patent 1,631,871 to Kelly, or modifications thereof. According to that process, mercaptobenzothiazole is produced by reacting aniline with carbon bisulfide and sulfur at superatmospheric pressures and elevated temperatures.

The product obtained, however, is contaminated with a number of impurities of a tarry nature. Accordingly, mercaptobenzothiazole, as so produced, ordinarily must be given some type of purification treatment previous to sale and use. Heretofore, this has most commonly consisted of treating the crude product with an excess of caustic soda to dissolve the product as its sodium salt. Most of the impurities are also soluble to a significant extent in aqueous caustic soda solution. Any undissolved material is allowed to settle out and is removed by filtration or other suitable means. On precipitation with acid, the clarified solution yields a final product still containing much of the original impurities. Accordingly, it is usually brown in color, and has a disagreeable odor.

To obtain a higher degree of purification, the crude product is digested with a deliberate deficiency of caustic. Many of the impurities, accordingly, remain undissolved and can be separated leaving a purer product. The purity thereof is not such, however, as to avoid formation of a tarry by-product precipitate containing mercaptobenzothiazole on oxidation of the purified product to disulfide. Also, because of deliberate caustic deficiency, separated solid impurities contain mercaptobenzothiazole. In each instance, the content of mercaptobenzothiazole is sufficient to warrant redigestion in caustic for recovery thereof. This, however, increases equipment requirements and cost of production. The recovered mercaptobenzothiazole product, moreover, is of less pure grade than that initially taken.

Purification by using alkaline substances other than caustic soda has also been suggested. Again, the results have not been wholly satisfactory. Purification when so attempted usually is not sufficiently selective. In many cases, an excessive reaction volume is required. This in itself makes such a method economically impractical.

It is, therefore, a primary object of this invention to devise a purification process not subject to these various difficulties. Such a process should be capable of recovering substantially all of the mercaptobenzothiazole from the crude product without reworking solid impurities. It should be capable of such control that a product of desired purity, depending on ultimate use, may be obtained. Additionally, it should not require excessive amounts of chemical reagents or the use of unusual equipment.

Surprisingly, these objects have been met by a process employing caustic soda to solubilize the crude mercaptobenzothiazole. In view of the failings of known processes using caustic soda, the results obtained by the present process are completely unexpected. In general, the process of the invention may be simply stated. Crude mercaptobenzothiazole is treated with an excess of caustic soda to insure dissolution of all mercaptobenzothiazole. The solution is then subjected to a pre-oxidation treatment which results in precipitation of impurities. After separation thereof, the clarified solution containing mercaptobenzothiazole as the sodium salt may be acidified to give the free mercaptobenzothiazole, or treated to give the disulfide.

While the general description of the process has been simply stated, the operational procedure is more involved and requires considerable care. After completion of the autoclave reaction of aniline, sulfur and carbon bisulfide, the crude mercaptobenzothiazole melt is discharged into tanks containing water at about 60–70° C. The resultant suspension is agitated and an aqueous solution of about 50% caustic soda added. To insure complete dissolution of the mercaptobenzothiazole, an excess of caustic soda is used. The degree of excess may vary but generally will be such as to provide a free alkalinity of solution of about 0.01–0.1% sodium hydroxide. This can be maintained by adding caustic when necessary. Because of the excess caustic, a large part of the impurities will also be dissolved. It is an advantage of this invention, however, that a high purity product may nevertheless be obtained. Although not necessary, complete digestion may be effected more rapidly by heating the liquor to about 80–90° C. Heating may be practiced in any suitable manner.

After digestion is complete, the concentration of mercaptobenzothiazole in the liquor may be as high as 25–30%. By lowering the concentration, some of the impurities, which are otherwise soluble at higher concentrations, can be precipitated. The degree of precipitation that can be so effected will depend on the extent of dilution. An optimum concentration is about 5–15% at a temperature of about 45° C. Below this, any additional precipitate obtained may be offset by difficulties in subsequent handling of the excessively diluted liquor. Dilution may be accomplished by addition of water which also serves the secondary function of cooling.

After solids precipitated by dilution have settled, a sample of clear liquor is taken. This is titrated potentiometrically to the inflection point in the potential curve with a solution of a pre-oxidizing agent. The amount of pre-oxidizing agent necessary to effect the desired degree of precipitation of impurities from solution without oxidizing mercaptobenzothiazole to the disulfide can then be calculated.

Any material may be employed as a pre-oxidizing agent which is selective in its oxidizing capacity so that substantially all impurities can be oxidized before oxidation of benzothiazole to the disulfide occurs. There are, however, various factors which, as a practical matter, limit the choice of materials. Some, for instance, are too costly. Others present corrosion and handling problems. Still other materials may contaminate the final product to a degree which renders it useless for many purposes. The materials most suited as pre-oxidizing agents are those which, in aqueous medium, provide an active available oxygen atom. Among these are the ammonium, and alkali and alkali earth metal salts of peracids such as persulfuric, perchloric, percarbonic, perboric, permanganic, peracetic, perbenzoic and the like; peroxides such as hydrogen peroxide, potassium peroxide, barium peroxide, calcium peroxide, dibenzoyl peroxide, and the like; and alkali and alkali earth metal chlorites and hypochlorites such as sodium, potassium, calcium and magnesium chlorites and hypochlorites.

When employing peroxides, chlorites and hypochlorites as pre-oxidizing agents, precipitated impurities tend to redissolve to a slight degree. This is believed to be caused by the presence of by-product sodium hydroxide which acts as a solubilizing agent. To avoid redissolution, an alkali binding agent, such as sodium bicarbonate or the like, may be employed in conjunction with the pre-oxidizing agent.

One of the advantages of this invention is that the extent of purification may be easily controlled. Depending on the purpose for which it is used, mercaptobenzothiazole will vary in purity. For instance, mercaptobenzothiazole used in the manufacture of disulfide must necessarily be of greater purity than that of mercaptobenzothiazole used as a rubber chemical. Degree of purity can be easily controlled in the instant invention by the amount of pre-oxidizing agent added which can be determined from the potentiometric titration.

The required amount of pre-oxidizing agent to obtain the desired extent of purification is added to the solution, preferably with simultaneous stirring. After reaction is complete, stirring is stopped and the tarry precipitate containing the impurities separated and discarded. The resultant clarified solution contains mercaptobenzothiazole as the sodium salt.

Depending on subsequent use of the product, this clarified solution is either treated to precipitate the free mercaptobenzothiazole or subjected to further reaction, such as oxidation, to produce the disulfide. In the former, the solution is agitated and acidified with hydrochloric or sulfuric acid. The resultant slurry is centrifuged or otherwise treated to separate the purified mercaptobenzothiazole as a wet cake. In preparation of disulfide, the clarified solution is further treated with an oxidizing agent and resultant disulfide dewatered, dried and milled.

It is an added feature of this invention that a product of purity heretofore known but not realized may be obtained when the process is employed in conjunction with purification by steam stripping. Steam stripping of crude mercaptobenzothiazole forms the subject matter of application for United States Letters Patent Serial Number 134,812, filed December 23, 1949, now U. S. Patent No. 2,658,864, by Robert H. Ebel, one of the inventors herein. As described therein, the crude melt is subjected to countercurrent stripping with steam at a temperature of 170-240° C. Substantially all benzothiazole, hydrogen sulfide and unreacted aniline are thereby separated from the mercaptobenzothiazole. Partial purification by steam stripping increases the effectiveness of the pre-oxidation treatment since aniline and hydrogen sulfide, if present during pre-oxidation, are also oxidized, which influences the oxidation of other impurities.

The following examples further illustrate the invention but are not intended to be limiting. Unless otherwise noted, all parts are by weight. For simplicity, the following abbreviations will be employed:

MBT—mercaptobenzothiazole
NaMBT—sodium salt of mercaptobenzothiazole

*Example 1*

4350 parts of crude MBT melt is subjected to countercurrent stripping with steam at 210° C. The resultant stripped melt containing 3850 parts real MBT is dissolved in 8000 parts of water containing 2050 parts of 50% NaOH and heated to 85° C. with agitation until all solids are in solution. The solution is then diluted with water to 86,030 parts of 42° C.

*Example 2*

1500 parts of the crude NaMBT solution of Example 1 is heated to 45° C. and excess dilute sulfuric acid added. The resultant slurry is filtered and the filter cake washed well with warm water and dried. The yield of product is 71.7 parts. It has a purity of 95.4% MBT and melts at 172.2°–177.8° C. The color of the product is tan.

*Example 3*

To determine the amount of pre-oxidant required for pre-oxidation, an aliquot of the crude NaMBT solution of Example 1 is placed in a beaker equipped with a stirrer. A calomel-platinum electrode system is immersed in the solution and the electrodes connected to a standard commercial pH meter equipped to read electrode potential in millivolts. The initial reading is 528 mv. A 2.0% ammonium persulfate solution is added to the NaMBT solution by means of a burette. As impurities are oxidized, the potential drops slowly to about 400 mv. followed by a sharp drop to about 270 mv. Further addition of ammonium persulfate does not appreciably change the potential. Between the 400 and 270 mv. potentials the plot of mv. reading against ammonium persulfate shows a point of maximum slope. This is taken as the end-point of the titration. About 310 parts of ammonium persulfate are required to pre-oxidize the NaMBT solution completely.

*Example 4*

1500 parts of the crude NaMBT solution of Example 1 is heated to 45° C., and 5.4 parts of $(NH_4)_2S_2O_8$ added with stirring. Resultant slurry is filtered and the filtrate acidified. Precipitated product is filtered, washed, and dried. The yield of product is 65.1 parts having a purity of 99.3% MBT and melting at 179.8°–182.6° C. The color is creamy white. 7.3 parts of a dark brown MBT-free tar, with a softening point of about 40° C., is obtained on filtration of the persulfate-treated solution.

*Example 5*

To show how the degree of purification can be controlled, the procedure of Example 4 is repeated using one-half the amount, 2.7 parts, of $(NH_4)_2S_2O_8$. 68.1 parts of product with a purity of 97.5% MBT is obtained which melts at 174.8°–179.2° C. The color of the product is light cream. 3.3 parts of an MBT-free tar is obtained on filtration of the persulfate-treated solution.

*Example 6*

Example 4 is repeated using 6.75 parts o $K_2S_2O_8$ the pre-oxidant. Product yield is 66.8 parts with a purity of 99.0% MBT melting at 177.7°–180.3°C. The color is light tan. 5.0 parts of an MBT-free tar is obtained.

*Example 7*

Example 4 is repeated except the crude NaMBT solution is treated with 8.02 parts of $NaHCO_3$ and 31 parts of an 11% NaOCl solution. The product yield is 65.8 parts having a purity of 99.1% MBT and melting at 176.7°–180.0° C. The color is light yellow. 6.6 parts of an MBT-free tar is obtained.

*Example 8*

The procedure of Example 4 is followed using 13.75 parts of $NaHCO_3$ and 2.55 parts of 130 volume $H_2O_2$. The product yield is 67.0 parts having a purity of 99.0% MBT. It is very light yellow in color and melts at 177.3°–180.3° C. 5.1 parts of MBT-free tar is obtained.

*Example 9*

Example 4 is repeated using 4.65 parts of $NaHCO_3$ and 2.49 parts of 85% $NaClO_2$ dissolved in 15 parts of water. The product yield is 66.3 parts with a purity of 99.0% MBT. The product is creamy white and melts at 178.3°–181.0° C. 5.1 parts of an MBT-free tar is obtained.

The increase in product purity obtained by first subjecting the crude melt to countercurrent stripping with steam is demonstrated by the following examples:

Example 10

150 parts of unstripped crude mercaptobenzothiazole melt containing 132 parts of MBT (88%) is dissolved in 375 parts of water and 70 parts of 50% NaOH solution. The mix is stirred at 80° C. until solution is complete, the solution containing a small amount of excess alkali. The solution is diluted to 2700 parts with cold water at 45° C., settled and decanted. 200 parts of the decanted solution is acidified with dilute $H_2SO_4$. Resultant precipitate is filtered, washed, and dried. Purity of product is 96.9% MBT melting at 173.1°–179.0° C.

Example 11

To 2000 parts of the decanted solution of Example 10 is added 7.0 parts of $(NH_4)_2S_2O_8$ with stirring at 50° C. After settling, the solution is decanted from the precipitated MBT-free tars. 200 parts of the decanted solution is acidified with dilute $H_2SO_4$ and resultant precipitate filtered, washed and dried. Purity of product is 98.4% MBT melting at 177.3°–180.3° C.

Example 12

150 parts of the crude MBT melt of Example 10 is subjected to countercurrent stripping with steam. The stripped melt is dissolved in 375 parts of water and 65 parts of 50% NaOH solution. The mix is stirred at 80° C. until solution is complete, the solution containing a small amount of excess alkali. The solution is then diluted to 2900 parts with cold water at 45° C. and 9.5 parts of ammonium persulfate added. After settling, solution is decanted from the precipitated MBT-free tars. 200 parts of the solution is acidified with dilute $H_2SO_4$ and the resultant precipitate filtered, washed, and dried. Purity of product is 99.6% MBT melting at 180.2°–181.7° C.

We claim:

1. A process of treating crude mercaptobenzothiazole prepared by reacting aniline, carbon bisulfide and sulfur to recover substantially the entire mercaptobenzothiazole content thereof as a mercaptobenzothiazole product of selected predetermined purity without formation of and retreatment of tarry settler heels and recovered liquors which comprises: digesting said crude mercaptobenzothiazole in aqueous solution with caustic soda to dissolve substantially all solids including substantially the entire mercaptobenzothiazole content, adding to resultant liquor a material selected from the group consisting of salts of peracids, peroxides, chlorites, and hypochlorites whereby oxidation and precipitation of dissolved impurities occurs to the extent necessary to obtain a mercaptobenzothiazole product of selected predetermined purity without oxidation of mercaptobenzothiazole, the amount of material added being no greater than that necessary to obtain a mercaptobenzothiazole product of said selected predetermined purity, and separating resultant mercaptobenzothiazole-free tarry precipitate.

2. A process according to claim 1 in which the material is a salt of a peracid.

3. A process according to claim 1 in which the material is ammonium persulfate.

4. A process according to claim 1 in which the material is a peroxide.

5. A process according to claim 1 in which the material is a chlorite.

6. A process according to claim 1 in which the material is a hypochlorite.

7. A process of treating crude mercaptobenzothiazole prepared by reacting aniline, carbon bisulfide and sulfur to recover substantially the entire mercaptobenzothiazole content thereof as a mercaptobenzothiazole product of selected predetermined purity without formation of and retreatment of tarry settler heels and recovered liquors which comprises: digesting said crude mercaptobenzothiazole in aqueous solution with caustic soda to dissolve substantially all solids including substantially the entire mercaptobenzothiazole content, diluting resultant liquor to a sodium mercaptobenzothiazole content of about 5–15%, adding ammonium persulfate to said liquor whereby oxidation and precipitation of dissolved impurities occurs to the extent necessary to obtain a mercaptobenzothiazole product of selected predetermined purity without oxidation of mercaptobenzothiazole, the amount of ammonium persulfate added being no greater than that necessary to obtain a mercaptobenzothiazole product of said selected predetermined purity, and separating resultant mercaptobenzothiazole-free tarry precipitate.

8. A process of treating crude mercaptobenzothiazole prepared by reacting aniline, carbon bisulfide and sulfur to recover substantially the entire mercaptobenzothiazole content thereof as a mercaptobenzothiazole product of selected predetermined purity without formation of and retreatment of tarry settler heels and of recovered liquors which comprises: subjecting said crude mercaptobenzothiazole to distillation with steam at a temperature of 170°–240° C., digesting resulting mercaptobenzothiazole in aqueous solution with caustic soda to dissolve substantially all solids including substantially the entire mercaptobenzothiazole content, adding to resultant liquor a material which provides an active available oxygen atom, is capable of oxidizing mercaptobenzothiazole to dibenzothiazolyl disulfide and which is selective in its oxidizing capacity whereby oxidation and precipitation of dissolved impurities occurs to the extent necessary to obtain a mercaptobenzothiazole product of selected predetermined purity without oxidation of mercaptobenzothiazole, the amount of material added being no greater than that necessary to obtain a mercaptobenzothiazole product of said selected predetermined purity, and separating resultant mercaptobenzothiazole-free tarry precipitate.

References Cited in the file of this patent

UNITED STATES PATENTS

| Number | Name | Date |
| --- | --- | --- |
| 1,662,015 | Sebrell et al. | Mar. 6, 1928 |
| 2,286,995 | Reichert et al. | June 16, 1942 |
| 2,419,256 | Dorn | Apr. 22, 1947 |
| 2,468,952 | Beber | May 3, 1949 |
| 2,631,153 | Paul et al. | Mar. 10, 1953 |
| 2,656,354 | Mathes et al. | Oct. 20, 1953 |
| 2,658,864 | Ebel | Nov. 10, 1953 |